(12) United States Patent
Zhou et al.

(10) Patent No.: US 8,099,377 B2
(45) Date of Patent: Jan. 17, 2012

(54) DECISION-MAKING METHOD, DECISION-MAKING SYSTEM, AND POLICY DECISION FUNCTION

(75) Inventors: Qing Zhou, Shenzhen (CN); Ying Hu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 63 days.

(21) Appl. No.: 12/776,972

(22) Filed: May 10, 2010

(65) Prior Publication Data

US 2010/0223222 A1 Sep. 2, 2010

Related U.S. Application Data

(63) Continuation of application No. PCT/CN2009/071070, filed on Mar. 30, 2009.

(30) Foreign Application Priority Data

Mar. 31, 2008 (CN) .......................... 2008 1 0090236

(51) Int. Cl.
*G06F 17/00* (2006.01)
*G06N 5/02* (2006.01)

(52) U.S. Cl. ............................ 706/47; 706/46; 706/45

(58) Field of Classification Search .................. None
See application file for complete search history.

(56) References Cited

U.S. PATENT DOCUMENTS

| | | | | |
|---|---|---|---|---|
| 5,519,706 A * | 5/1996 | Bantz et al. | ................. | 455/435.2 |
| 6,766,160 B1 * | 7/2004 | Lemilainen et al. | .......... | 455/411 |
| 2006/0072595 A1 * | 4/2006 | Broberg et al. | ............... | 370/410 |
| 2008/0051069 A1 * | 2/2008 | Chin | ........................ | 455/414.1 |

FOREIGN PATENT DOCUMENTS

| | | |
|---|---|---|
| CN | 101072170 A | 11/2007 |
| CN | 101150782 A | 3/2008 |
| WO | 2006/050758 A1 | 5/2006 |
| WO | WO 2006/050758 A1 | 5/2006 |

OTHER PUBLICATIONS

Koutsopoulou et al., M., "A platform charging, billing, and accounting in future mobile networks", Computer Communications 30, pp. 516-526, 2007.*
Hasan et al., "Authentication, Authorization, Accounting, and Charging for the Mobile Internet", Mobile 2001, pp. 1-6, 2001.*
Koutsopoulou et al., M., "Adaptive Charging Accounting and Billing system for the support of advance business model for VAS provision in 3G systems", PIMRC 2001, pp. 1-5, Sep.-Oct. 2001.*

(Continued)

*Primary Examiner* — Jaffrey A Gaffin
*Assistant Examiner* — Adrian Kennedy
(74) *Attorney, Agent, or Firm* — Brinks Hofer Gilson & Lione

(57) ABSTRACT

A decision-making method, a decision-making system, and a PDF are disclosed herein. The decision-making method comprises: receiving application session data that carries access network data and access user data; and making policy and charging decisions according to the application session data. Through the decision-making method, decision-making system, and PDF, the application session data comprises access network data and access user data of the UE so that the PCRF can uniquely determine a user according to the access network data or the access user data and the IP address allocated by the network to the UE, and make policy and charging decisions.

10 Claims, 7 Drawing Sheets

OTHER PUBLICATIONS

Lataoui et al., O., "A QoS Management Architecture for Packet Switched 3rd Generation Mobile Systems", INTEROP '00, pp. 1-10, 2001.*

Lamparter et al., B., "Charging support for ad hoc stub networks", Computer Communications 26, pp. 1504-1514, 2003.*

Ioannidis et al., J., "IP-based Protocols for Mobile Internetworking", ACM, pp. 235-245, 1991.*

International search Report issued in corresponding PCT Application No. PCT/CN2009/071070; mailed Jul. 16, 2009.

Office Action issued in corresponding Chinese Patent Application No. 200810090236.3, mailed Dec. 25, 2009.

Extended European Search Report issued in corresponding European Patent Application No. 09727062.3, mailed Jan. 26, 2011.

Change Request, 23.203 CR 0115 Rev. 8.0.0. GPP TSG SA WG2 Meeting #63, TD S2-081909. Athens, Greece, Feb. 18-22, 2008.

Change Request, 23.203 CR 0156 Rev.2 8.1.1 GPP TSG-WG SA2 Meeting #65, S2-084138. Prague, Czech Republic, May 12-16, 2008.

Nokia, "Updates to PCC Decision Input in Rel-7 PCC TS 23.203", 3GPP TSG SA WG2 Architecture—S2#49, S2-052631. Yokosuka, Japan, Nov. 7-11, 2005.

3$^{rd}$ Generation Partnership Project; Technical Specification Group Services and System Aspects; Policy and Charging Control Architecture (Release 8), Global System for Mobile Communications. 3GPP TS 23.203 V8.0.0, Dec. 2007.

3$^{rd}$ Generation Partnership Project; Technical Specification Group Services and System Aspects; Architecture Enhancements for Non-3GPP Accesses (Release 8), 3GPP TS 23.402 V8.1.1, Mar. 2008.

3$^{rd}$ Generation Partnership Project; Technical Specification Group Services and System Aspects; General Packet Radio Service (GPRS) Enhancements for Evolved Universal Terrestrial Radio Access Network (E-UTRAN) Access (Release 8), Global System for Mobile Communications. 3GPP TS 23.401 V8.1.0, Mar. 2008.

3$^{rd}$ Generation Partnership Project; Technical Specification Group Services and System Aspects; System Enhancements for the Use of IMS Services in Local Breakout and Optimal Routing of Media (Release 8), Global System for Mobile Communications. 2GPP TR 23.894 V0.3.1, Jan. 2008.

* cited by examiner

DECISION-MAKING METHOD, DECISION-MAKING SYSTEM, AND POLICY DECISION FUNCTION

CROSS-REFERENCE TO RELATED APPLICATIONS

This application is a continuation of International Application No. PCT/CN2009/071070, filed on Mar. 30, 2009, which claims priority to Chinese Patent Application No. 200810090236.3, filed on Mar. 31, 2008, both of which are hereby incorporated by reference in their entireties.

FIELD

The present disclosure relates to communications technologies, and in particular, to a decision-making method, a decision-making system, and a Policy Decision Function (PDF).

BACKGROUND

A mobile communication network comprises two parts: a Circuit Switched (CS) domain, and a Packet Switched (PS) domain. The CS domain bears traditional CS voice services, and the PS domain provides PS services. In order to provide multimedia services over a packet network, the mobile communication network further comprises an IP Multimedia Subsystem (IMS). An IMS network can provide multimedia services over a packet network, and provide voice services in place of the CS domain.

In order to implement policy and charging control on a mobile packet network, the 3rd Generation Partnership Project (3GPP) introduces Policy and Charging Control (PCC) architecture. In the PCC architecture, a Policy Control and Charging Rules Function (PCRF) can receive a request from an Application Function (AF) such as a Proxy Call Session Control Function (P-CSCF) in IMS network, generate policy and charging rules, such as generate corresponding Quality of Service (QoS) rules, and deliver the QoS rules to the Packet Data Network (PDN) gateway (PGW) in a Policy and Charging Enforcement Function (PCEF) such as 3GPP Evolved Packet System (EPS) network architecture.

In the foregoing architecture, in the policy request delivered by the AF to the PCRF, a user may be identified by a user identifier or IP address of a piece of User Equipment (UE). But, in the existing IMS network architecture, the IMS network is unaware of the user identifier according to which the UE accesses the mobile packet network.

In practice, the IP addresses allocated by the mobile packet network to a user are not unique globally. For example, the private network IP addresses allocated by the mobile packet network to a UE may be overlapped with each other on different data networks of a mobile packet network. In addition, when the AF and the UE are located on different mobile packet networks, if the address of the UE is allocated by the mobile packet network in the visited area of the UE, the IP address of the UE may be overlapped with the IP address allocated by the home mobile packet network, or other visited mobile packet networks.

In the process of developing the embodiments of present disclosure, the inventor finds that an IP address does not identify a user uniquely in the foregoing scenarios. In this case, when the AF delivers a policy request, the PCRF is unable to determine the user according to the IP address in the policy request, and therefore is unable to make policy and charging decisions.

SUMMARY

The embodiments of the present disclosure provide a decision-making method, a decision-making system, and a PDF. The PDF can determine a user according to the application session information or data of the AF, and make policy and charging decisions.

A decision-making method provided in an embodiment of the present disclosure comprises: receiving application session data that comprises access network data and access user data; and making policy and charging decisions according to the application session data.

In the foregoing decision-making method, the application session data comprises access network data and access user data so that the PDF can uniquely determine a user according to the access network data and the access user data, and make policy and charging decisions.

A PDF provided in an embodiment of the present disclosure comprises: a receiving module, adapted to receive application session data that comprises access network data and access user data; and a decision-making module, adapted to make policy and charging decisions according to the application session data.

The PDF can uniquely determine a user according to the access network data and the access user data included in the application session data, and make policy and charging decisions.

A decision-making system provided in an embodiment of the present disclosure comprises: an AF, adapted to provide application session data that comprises access network data and access user data; and a PDF, adapted to receive the application session data and make policy and charging decisions according to the application session data.

In the foregoing decision-making system, the application session data comprises access network data and access user data so that the PDF can uniquely determine a user according to the access network data and the access user data, and make policy and charging decisions.

The technical solution under the present disclosure is elaborated below with reference to accompanying drawings and preferred embodiments.

DETAILED DESCRIPTION OF THE EMBODIMENTS

The following detailed description is directed to the technical solution of the embodiments of present disclosure with reference to the accompanying drawings. The embodiments to be described are part of, rather than all of, the embodiments of the present disclosure. Additionally, all other embodiments, which can be derived by those skilled in the art from the embodiments given herein without any creative efforts, fall within the scope of the embodiments of present disclosure.

A decision-making method provided in an embodiment of the present disclosure comprises: receiving application session data that comprises access network data and access user data; and making policy and charging decisions according to the application session data.

Figure 1:
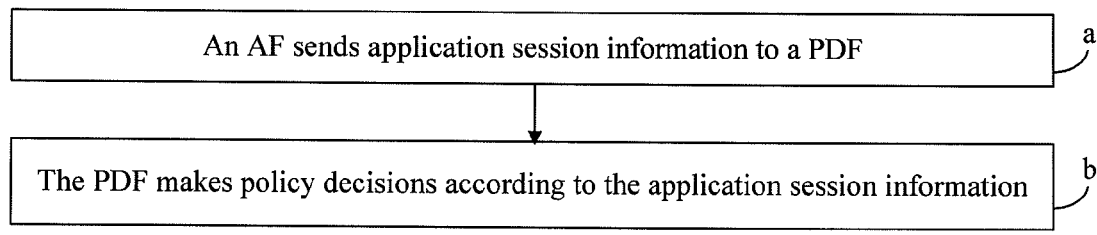
FIG. 1 is a flowchart of a decision-making method according to the first embodiment of the present disclosure.

FIG. 1 is a flowchart of a decision-making method according to the first embodiment of the present disclosure. As shown in FIG. 1, the method comprises:

Step a: An AF sends application session data to a PDF.

The AF is an entity capable of implementing application functions on the network, for example, an AF in 3GPP PCC architecture, or a P-CSCF on an IMS network; the PDF is an entity or unit that makes policy and charging decisions on the network, for example, a PCRF in 3GPP PCC architecture, or a PDF in 3GPP Rel6. The preceding application session data comprises access network data and access user data.

Furthermore, before sending the application session data to the PDF, the AF may interact with the UE to obtain the access network data and the access user data. The access user data comprises the IP address of the UE or the packet user identifier, and the IP address may be an IPv4 address or IPv6 address prefix.

If the access user data comprises the IP address of the UE, the access network data may include at least one of the following identifiers: a mobile packet network identifier; and a PDN identifier.

The mobile packet network identifier in the access network data is an identifier of a mobile packet network that allocates an IP address to the UE. If the UE is located on the visited network, and the IP address of the UE is allocated by the visited network, the mobile packet network identifier in the access network data is an identifier of the mobile packet network in the visited area of the UE; if the IP address of the UE is allocated by the home network, the mobile packet network identifier in the access network data is an identifier of the mobile packet network in the home area of the UE.

The mobile packet network identifier is generally composed of a Mobile Country Code (MCC) and a Mobile Network Code (MNC).

An Access Point Name (APN) is composed of an APN Network Identifier (NI) and an APN Operator Identifier (OI). The mobile packet network identifier may be an APN OI or another parameter. A PDN identifier comprises at least one of these items: APN NI and PGW address. The APN NI is mandatory of the APN, and may include a PDN identifier; the APN OI is optional and may include a mobile packet network identifier.

When the access user data comprises the packet user identifier of the UE, the access network data comprises a mobile packet network identifier. The mobile packet network identifier is an identifier of the mobile packet network in the home area of the UE.

Step b: The PDF makes policy and charging decisions according to the application session data.

The PDF may determine a user according to the access network data and the access user data in the application session data, obtain the subscription data of the user, and generate policy and charging rules. The policy and charging rules include charging data and/or QoS data.

The PDF sends the policy and charging rules to a PCEF. The PCEF may be a PGW, a Serving Gateway (SGW) or an Evolved Packet Data Gateway (ePDG) in the 3GPP EPS network architecture, or a unit that performs policy and charging on a non-3GPP network. The PDF can uniquely determine an IP-Connectivity Access Network (IP-CAN) session according to the access network data and the access user data in the application session data, and deliver the policy and charging rules to the PCEF corresponding to the IP-CAN session. The PCEF implements charging or ensures the QoS according to the policy and charging rules.

In the foregoing decision-making method, the application session data comprises access network data and access user data, so that the PDF can uniquely determine a user according to the access network data and the access user data, and make policy and charging decisions. The PDF can also uniquely determine an IP-CAN session according to the access network data and the access user data, and deliver the policy and charging rules to the PCEF unit corresponding to the IP-CAN session.

Figure 2:
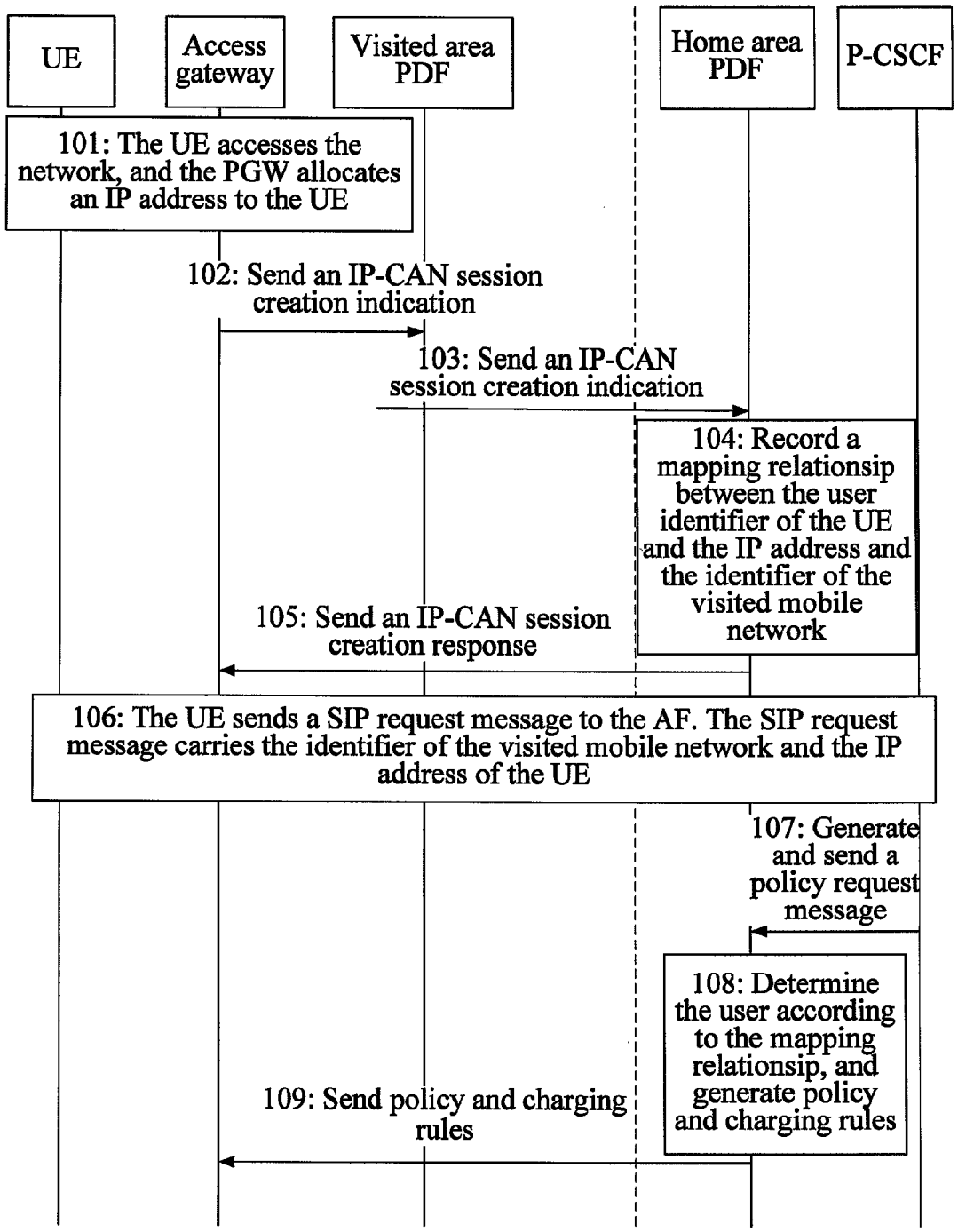
FIG. 2 is a signaling flowchart of a decision-making method according to the second embodiment of the present disclosure.

FIG. 2 is a signaling flowchart of a decision-making method according to the second embodiment of the present disclosure. As shown in FIG. 2, the method comprises the following steps:

Step 101: When the UE accesses the network, the access gateway (PGW) allocates an IP address to the UE.

The UE accesses the mobile packet network, namely, a Public Land Mobile-communication Network (PLMN), in the visited area. The PLMN in the visited area allocates a private network IP address (for example, 10.1.1.2I, in the following description, the IP address 10.1.1.2 is taken for an example only) to the UE, and notifies the visited area PLMN identifier to the UE. A Mobile Country Code (MCC) and a Mobile Network Code (MNC) in the identifier of the visited area PLMN can be included in a Location Area Identifier (LAI) and notified to the UE. Alternatively, the network sends the APN to the UE, and the CH part of the APN carries the visited area PLMN identifier in the IP address of the UE.

Step 102: The access gateway sends an IP-CAN session creation indication to the visited area PDF.

The PGW reports the IP-CAN session creation indication to the visited area PDF (vPCRF), and the IP-CAN session creation indication comprises a unique identifier of the UE, the private network IP address "10.1.1.2", and the MCC and the MNC in the identifier of the visited mobile packet network. The unique identifier of the UE may be data that uniquely identifies the UE, for example, an International Mobile Equipment Identifier (IMEI) of the UE, or an International Mobile Station equipment Identifier (IMSI) in a General Packet Radio Service (GPRS) network. The IMSI comprises home network data and user identifier data of the UE, and can identify the user uniquely. In this embodiment, the unique identifier is an IMSI; and the IP-CAN session creation indication is transmitted through a Credit-Control Request (CCR) message based on a Diameter protocol.

Step 103: The PDF in the visited area sends the IP-CAN session creation indication to the PDF in the home area.

According to the user's home network data (which may be included in the IMSI), the vPCRF determines the address of the home area PDF (hPCRF) in the home network, and sends the IP-CAN session creation indication to the hPCRF.

Step 104: The PDF in the home area generates a unique identifier mapping table of the UE, and records the mapping relationship between the IMSI of the UE and the IP address of the UE and the identifier of the mobile packet network in the visited area.

The hPCRF generates a unique identifier mapping table of the UE. The unique identifier mapping table of the UE records the mapping relationship between the unique identifier IMSI of the UE, the MCC and MNC of the accessed visited area network, and the private network IP address "10.1.1.2". The unique identifier of the UE can be obtained by querying the unique identifier mapping table of the UE according to the IP address of the UE and the identifier of the mobile packet network in the visited area.

Step 105: The PDF in the home area sends an IP-CAN session creation response to the access gateway.

Step 106: The UE sends a SIP request message to the AF. The SIP request message carries the identifier of the mobile packet network in the visited area of the UE and the private network IP address.

The UE sends an IMS session request, and sends a SIP request message to the P-CSCF. A Session Description Protocol (SDP) in the SIP message body carries the address and the port data of the media (IP address "10.1.1.2", port number "2312", in the following description, the port number 2312 is taken for an example only). Meanwhile, the SIP request message sent by the UE carries the identifier of the mobile packet network in the visited area of the UE. The UE inserts a Cell Global Identifier (CGI) into a P-AccessNetworkInfo header field of the SIP request message. The CGI comprises the MCC and the MNC in the identifier of the mobile packet network in the visited area.

After the UE sends a SIP request message to the PGW, the PGW forwards the message to the P-CSCF which is located in the home area.

Step 107: The AF generates and sends a policy request message to the PDF in the home area. The application session data in the policy request message comprises the identifier of the mobile packet network in the visited area of the UE and the IP address of the UE.

The P-CSCF sends a policy request to the hPCRF in the home area. The policy request carries the MCC and the MNC in the identifier of the mobile packet network in the visited area (namely, the MCC and the MNC carried in the SIP request message sent by the UE), and carries the IP address (10.1.1.2) of the UE. The policy request is a Diameter AA-Request (AAR) message. To make the Diameter protocol carry the MCC and the MNC of the identifier of the mobile packet network in the visited area, the Attribute Value Pair (AVP) of a 3GPP SGSN network identifier "3GPP-SGSN-MCC-MNC" used on a Gx interface in an existing GPRS network may be re-used, or a new AVP may be defined, for example, a 3GPP PGW network identifier "3GPP-PGW-MCC-MNC AVP". The AVP is designed to transmit MCC and MNC data between the AF and the PDF.

Step 108: The PDF in the home area determines a user uniquely according to the received IP address and the identifier of the mobile packet network in the visited area, and generates the corresponding policy and charging rules.

The hPCRF may query the subscription database to obtain the subscription data of the user and generate the policy and charging rules. For example, according to the identifier of the mobile packet network in the visited area and the IP address (10.1.1.2) of the UE which are carried in the policy request sent by the P-CSCF in step 107, the hPCRF searches UE's unique identifier mapping table generated in step 104 to obtain the unique identifier (IMSI) of the UE, and searches the subscription database of the user according to the IMSI to obtain the subscription data of the user, and generate the policy and charging rules.

The hPCRF may generate policy and charging rules according to the local policy.

Step 109: The PDF in the home area sends the policy and charging rules to the access gateway.

The hPCRF delivers the policy and charging rules to the PGW in the visited area.

Alternatively, the hPCRF determines an IP-CAN session uniquely according to the identifier of the mobile packet network in the visited area and the IP address received in step 107, and delivers the policy and charging rules to the visited area PGW corresponding to the IP-CAN session.

In the foregoing method for making policy and charging decisions, an identifier of the visited area mobile packet network which allocates the IP address to the UE is added to the application session data. Therefore, the PCRF can determine the user uniquely according to the IP address allocated by the mobile packet network in the visited area to the UE and the identifier of the mobile packet network in the visited area, and make policy and charging decisions. Alternatively, the PCRF determines an IP-CAN session uniquely according to the IP address allocated by the mobile packet network in the visited area to the UE and the identifier of the mobile packet network in the visited area, and delivers the policy and charging rules to the visited area PGW corresponding to the IP-CAN session.

Figure 3:
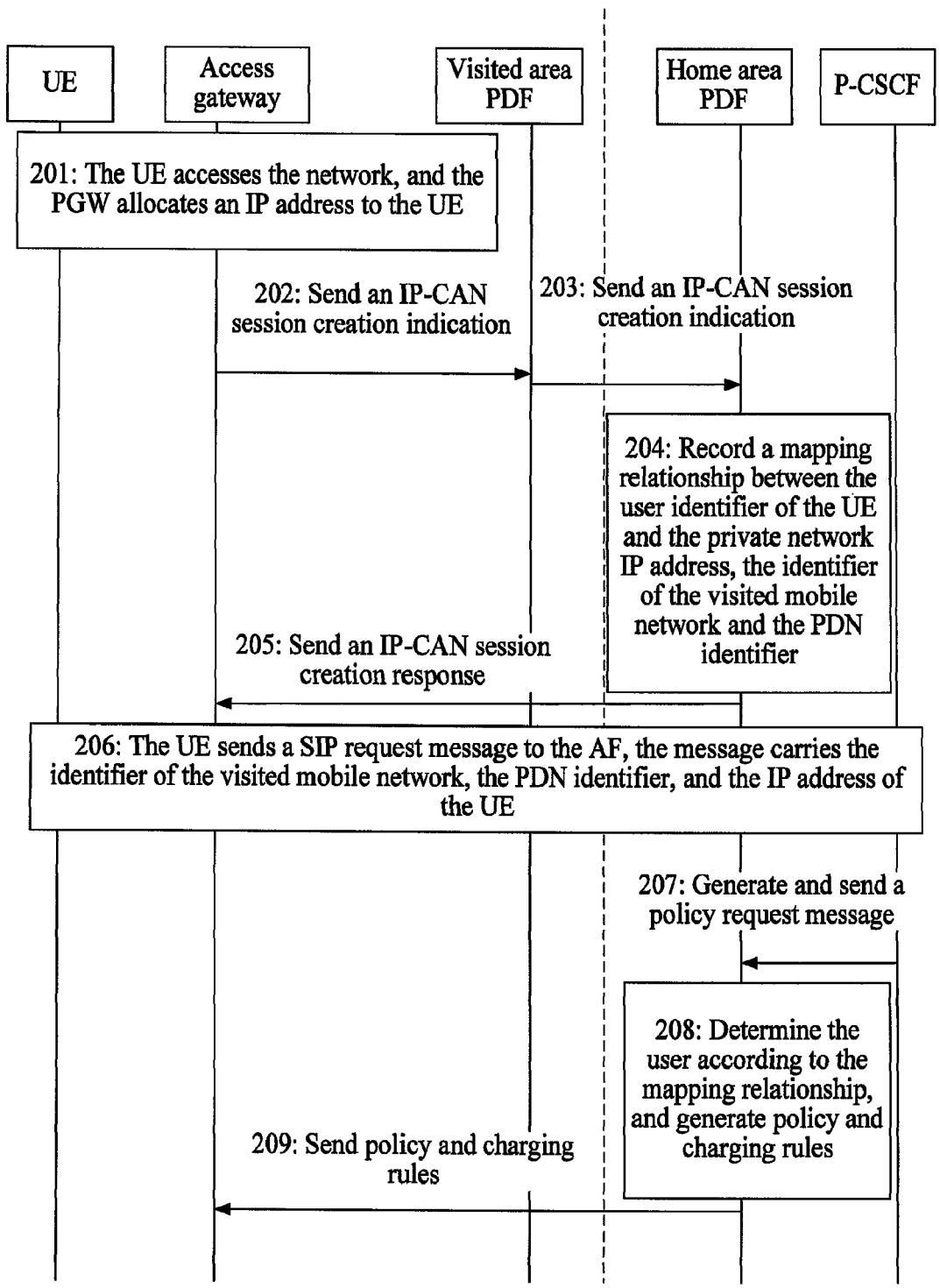
FIG. 3 is a signaling flowchart of a decision-making method according to the third embodiment of the present disclosure.

FIG. 3 is a signaling flowchart of a decision-making method according to the third embodiment of the present disclosure. As shown in FIG. 3, the method comprises:

Step 201: When the UE accesses the network, the access gateway allocates an IP address to the UE.

The UE accesses the PLMN network in the visited area. The PLMN network in the visited area allocates an IP address "10.1.1.2" to the UE, and notifies a PDN identifier and a PLMN identifier to the UE.

Using the method similar to step 101, the network may let the LAI of the user include the identifier of the mobile packet network in the visited area and the PDN identifier to the UE. The PDN identifier may be an APN NI, or a PDN identifier, or an address of the access gateway (PGW).

Alternatively, the network sends a complete APN to the UE. The NI part of the APN comprises the PDN identifier, and the OI part of the APN comprises the identifier of the mobile packet network in the visited area.

Step 202: The access gateway sends an IP-CAN session creation indication to the visited area PDF.

The access gateway sends the IP-CAN session creation indication to the vPCRF.

Step 203: The PDF in the visited area sends an IP-CAN session creation indication to the PDF in the home area.

According to the user's home network data (which may be included in the IMSI), the vPCRF determines the address of the home area PDF (hPCRF) in the home network, and sends the IP-CAN session creation indication to the hPCRF.

Step 204: The PDF in the home area generates a unique identifier mapping table of the UE. The table records the mapping relationship between the IMSI of the UE, the IP address of the UE, the identifier of the mobile packet network in the visited area, and the PDN identifier. According to the IP address of the UE, the identifier of the mobile packet network in the visited area, and the PDN identifier, the PDF in the home area searches the unique identifier mapping table for the unique identifier of the UE.

Step 205: The PDF in the home area sends an IP-CAN session creation response to the access gateway.

Step 206: The UE sends a SIP request message to the AF. The SIP request message carries the identifier of the mobile packet network in the visited area of the UE, the PDN identifier, and the IP address of the user.

The UE sends an IMS session request to the P-CSCF. The SDP in the SIP message body comprises an address and port data of the media (IP address "10.1.1.2", and port number "2312"). The SIP request message sent by the UE also carries the identifier of the mobile packet network in the visited area of the UE and the PDN identifier.

By using the method similar to step 106, the P-AccessNetworkInfo header field of the SIP request message sent by the UE may include the identifier of the mobile packet network in the visited area and the PDN identifier. To make the P-AccessNetworkInfo header field include the PDN identifier, an APN NI or the PDN IP parameter id or the gateway address parameter GWAddress may be added to the P-AccessNetworkInfo header field to include the APN NI, or PDN identifier or access gateway address data separately.

The UE may also use a complete APN to carry the identifier of the mobile packet network and the identifier of the PDN. The NI part of the APN comprises the PDN identifier, and the OI part of the APN comprises the identifier of the mobile packet network in the visited area.

The UE may reuse the existing SIP header field such as a P-AccessNetworkInfo header field, or use a new header field such as a P-APNInfo header field, to include the APN data.

Step 207: The AF generates and sends a policy request message to the PDF in the home area. The application session data in the policy request message comprises the identifier of the mobile packet network in the visited area of the UE, the PDN identifier, and the IP address of the UE.

This step differs from step 107 in the first embodiment in that a PDN identifier is added to the policy request message. To make the Diameter protocol carry the identifier of the network in the visited area and the PDN identifier data, the UE may reuse the 3GPP-SGSN-Address AVP used on the Gx interface in the existing GPRS network or define a new AVP such as 3GPP-PDN-Network-Id AVP to carry the access gateway address data in the PDN identifier data. The value of the AVP may be an APN NI or PDN identifier or access gateway address, and the AVP is designed to transmit the PDN identifier data between the AF and the PDF.

The AF may also use a complete APN to carry the identifier of the mobile packet network and the identifier of the PDN. The NI part of the APN comprises the PDN identifier, and the OI part of the APN comprises the identifier of the mobile packet network in the visited area.

In order to transmit APN data in the Diameter protocol, a new AVP such as 3GPP-APN-Info AVP may be defined for transmitting the identifier of the mobile packet network and the identifier of the PDN between the AF and the PDF.

Step 208: The PDF in the home area determines a user uniquely according to the IP address, the PDN identifier and the identifier of the mobile packet network in the visited area, which are received in step 207; and generates the corresponding policy and charging rules.

According to the identifier of the mobile packet network in the visited area, the PDN identifier, and the IP address received in step 207, the PDF in the home area may search the UE's unique identifier mapping table generated in step 204 to obtain the unique identifier data "IMSI" of the UE, search the subscription database of the user according to the IMSI to obtain the subscription data of the user, and generate the policy and charging rules.

The PDF in the home area may generate the corresponding policy and charging rules according to the local policy.

Step 209: The PDF in the home area sends the policy and charging rules to the access gateway.

Alternatively, the hPCRF determines an IP-CAN session uniquely according to the identifier of the mobile packet network in the visited area, the IP address, and the PDN identifier received in step 207, and delivers the policy and charging rules to the PGW corresponding to the IP-CAN session.

In the foregoing method for making policy and charging decisions, an identifier of the visited area mobile packet network and a PDN identifier of the UE are added to the application session data. Therefore, the PCRF can determine the user uniquely according to the IP address allocated by the network to the UE, the identifier of the mobile packet network in the visited area, and the PDN identifier; and make policy and charging decisions. Alternatively, the PCRF determines an IP-CAN session uniquely according to the IP address allocated by the network to the UE, the identifier of the mobile packet network in the visited area, and the PDN identifier; and delivers the policy and charging rules to the PGW corresponding to the IP-CAN session.

Figure 4:
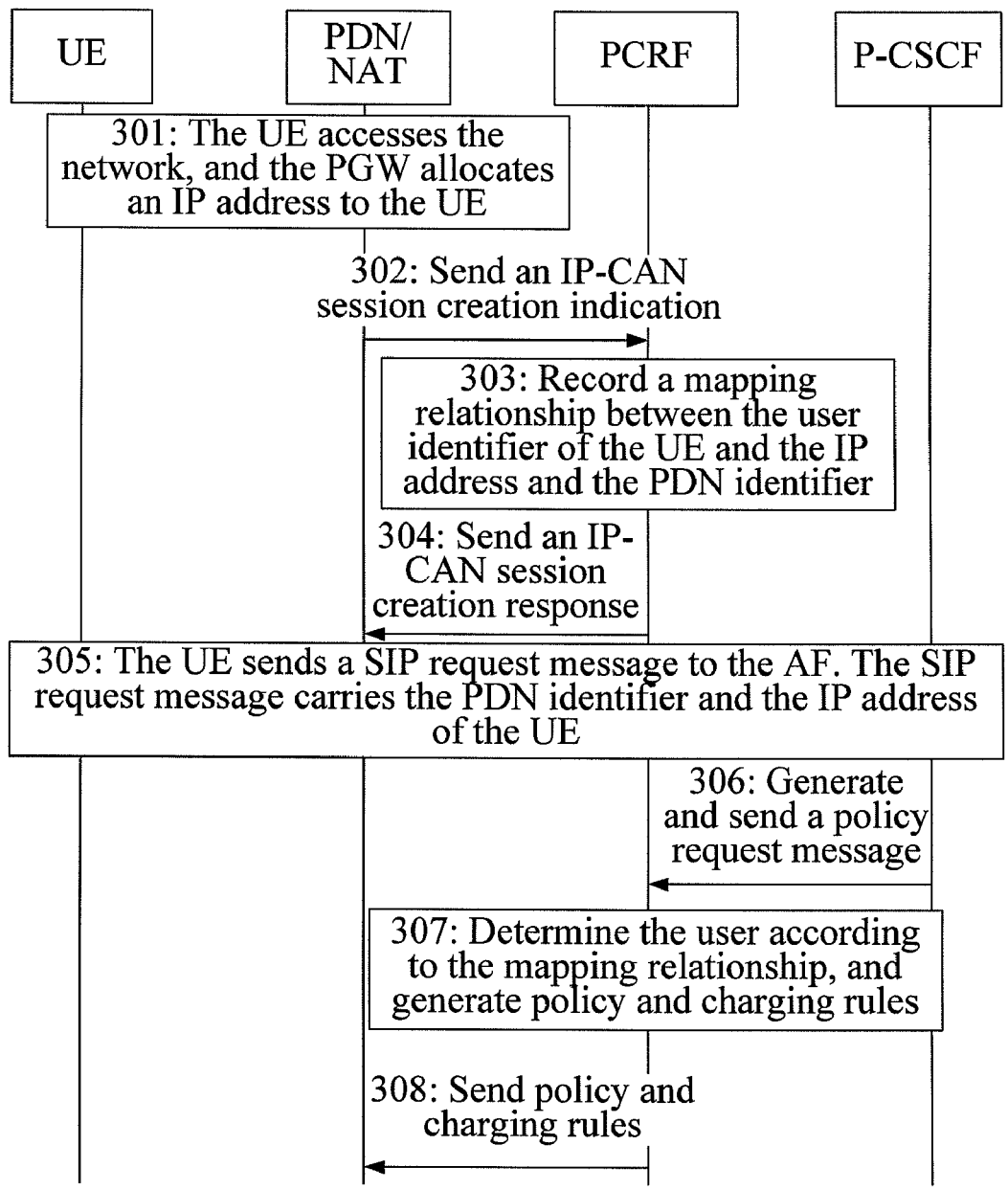
FIG. 4 is a signaling flowchart of a decision-making method according to the fourth embodiment of the present disclosure.

FIG. 4 is a signaling flowchart of a decision-making method according to the fourth embodiment of the present disclosure. As shown in FIG. 4, the method comprises the following steps:

Step 301: When the UE accesses the network, the access gateway allocates a private network IP address to the UE.

In a non-roaming scenario, the UE accesses the home PLMN. The network allocates a private network IP address "10.1.1.2" to the UE, and notifies the identifier of the local mobile packet network to the UE. Because the visited network is the same as the home network of the UE in this embodiment, the identifier of the local mobile packet network of the UE does not need to be applied in this embodiment. The network also notifies the PDN identifier data to the UE. The PDN identifier data may be an APN, or an address of the access gateway (PGW).

Step 302: The access gateway sends an IP-CAN session creation indication to the visited area PDF.

The PGW reports an IP-CAN session creation indication to the PCRF in the network. The IP-CAN session creation indication comprises the unique identifier data "IMSI" of the UE, the private network IP address "10.1.1.2", and the PDN identifier data. The IP-CAN session creation indication is carried in a Diameter CCR message.

In this embodiment, the PDN accessed by the UE uses a private network IP address, which was changed by a Network Address Translation (NAT) on the PGW. Therefore, the PGW performs NAT for the foregoing request. The IP address data in the IP-CAN session creation indication remains unchanged, and the PGW sends the IP-CAN session creation indication to the PCRF.

Step 303: The PDF generates a unique identifier mapping table of the UE. The table records the mapping relationship between the IMSI of the UE, the IP address of the UE, and the PDN identifier. According to the IP address of the UE and the PDN identifier, the PDF in the home network searches the unique identifier mapping table for the unique identifier of the UE.

The PCRF generates a unique identifier mapping table of the UE. The table records the mapping relationship between the user identifier "IMSI" of the UE, the PDN identifier, and the private network IP address "10.1.1.2".

Step 304: The PDF sends an IP-CAN session creation response to the access gateway.

Step 305: The UE sends a SIP request message to the AF. The SIP request message carries the PDN identifier and the private network IP address of the UE.

This step is the same as step 106 in the first embodiment except that the SIP request message carries different data. The PGW forwards the foregoing message to the P-CSCF after NAT, with the SIP message being unchanged.

Step 306: The AF generates and sends a policy request message to the PDF. The policy request message carries the PDN identifier and the private network IP address of the UE.

The P-CSCF sends a policy request to the PCRF. The application session data of the policy request comprises the identifier of the PDN accessed by the UE and the private network IP address. The policy request is a Diameter AAR message. To make the Diameter protocol to carry the PDN identifier data, the 3GPP-SGSN-Address AVP used on the Gx interface in the existing GPRS network may be reused, or a new AVP such as 3GPP-APN-Info or 3GPP-PDN-Network-Id AVP may be defined, to carry the access gateway address data in the PDN identifier data. The value of the AVP may be an APN or PDN identifier or access gateway address, and the AVP is designed to transmit the PDN identifier data between the AF and the PDF.

Step 307: The PDF determines a user uniquely according to the IP address and PDN identifier received in step 306, and generates the corresponding policy and charging rules.

According to the PDN identifier data and the UE's private network IP address in the policy request received from the P-CSCF in step 306, the PCRF may search the UE's unique identifier mapping table generated in step 303 to obtain the unique identifier data "IMSI" of the UE, search the subscription database of the user according to the IMSI to obtain the subscription data of the user, and generate the policy and charging rules.

The PDF may also generate the corresponding policy and charging rules according to the local policy.

Step 308: The PDF sends the policy and charging rules to the access gateway.

Alternatively, the PDF determines an IP-CAN session uniquely according to the IP address and the PDN identifier received in step 306, and delivers the policy and charging rules to the PGW corresponding to the IP-CAN session.

In the foregoing method for making policy and charging decisions, a PDN identifier of the UE is added to the application session data. Therefore, the PCRF can determine the user uniquely according to the private network IP address allocated by the network to the UE and the PDN identifier; and make policy and charging decisions. Alternatively, the PCRF determines an IP-CAN session uniquely according to the private network IP address allocated by the network to the UE and the PDN identifier; and delivers the policy and charging rules to the PGW corresponding to the IP-CAN session.

Figure 5:
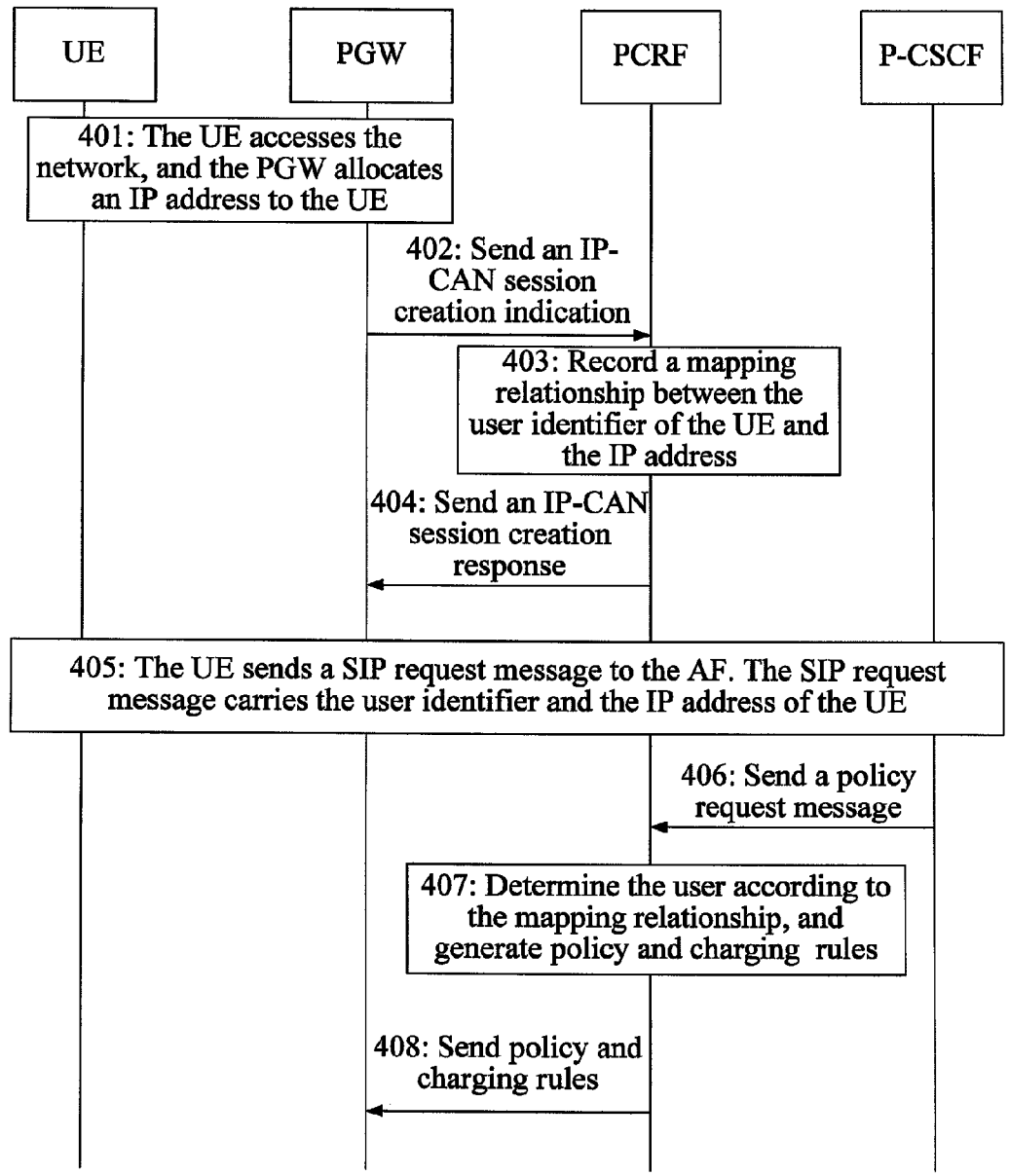
FIG. 5 is a signaling flowchart of a decision-making method according to the fifth embodiment of the present disclosure.

FIG. 5 is a signaling flowchart of a decision-making method according to the fifth embodiment of the present disclosure. As shown in FIG. 5, the method comprises the following steps:

Step 401: When the UE accesses the network, the access gateway allocates a private network IP address to the UE.

In a non-roaming scenario, the UE accesses the home PLMN. The network allocates an IP address "10.1.1.2" to the UE.

Steps 402-404: These steps are the same as steps 302-304 in the third embodiment of the user identifier method herein. The difference is that the PGW does not need to perform the NAT function, and the IP-CAN session creation indication carries no PDN identifier, and the PDF records the mapping relationship between the user identifier and the IP address of the UE.

Step 405: The UE sends a SIP request message to the AF. The SIP request message carries the user identifier and the IP address of the UE, and the identifier of the home mobile packet network of the UE.

The UE sends an IMS session request, and sends a SIP request message to the P-CSCF. A Session Description Protocol (SDP) in the SIP message body carries the address and the port of the media (IP address "10.1.1.2", port number "2312"). Meanwhile, the SIP request message sent by the UE carries the user identifier through which the UE accesses the data network, and the identifier of the home mobile packet network of the UE. For example, the IMSI in the GPRS network comprises the user identifier of the UE, and the MCC and MNC data of the home mobile packet network of the UE.

To make the SIP request message carry the user identifier, the User parameter in the P-AccessNetworkInfo header field may be extended to carry the home network data and the user identifier through which the UE accesses the data network.

Step 406: The P-CSCF sends a policy request message to the PCRF. The application session data in the policy request message comprises the user identifier of the UE, and the identifier of the home mobile packet network of the UE.

In the 3GPP PCC architecture, the policy request is a Diameter AAR message. A Subscription-Id AVP defined by the existing 3GPP specifications may be used to let the Diameter protocol carry the user identifier through which the UE accesses the data network.

Step 407: The PDF determines the user uniquely according to the user identifier of the UE and the identifier of the home mobile packet network of the UE, which are received in step 406; and generates the corresponding policy and charging rules.

In this embodiment, the PDF may search the subscription database of the user for the subscription data of the user according to the IMSI of the UE, and generate the policy and charging rules.

The PDF may also generate the corresponding policy and charging rules according to the local policy.

Step 408: The PDF sends the policy and charging rules to the access gateway.

Alternatively, the PDF determines an IP-CAN session uniquely according to the user identifier of the UE and the identifier of the home mobile packet network of the UE, which are received in step 406; and delivers the policy and charging rules to the PGW corresponding to the IP-CAN session.

In the foregoing method for making policy and charging decisions, the P-CSCF interacts with the UE to obtain the user identifier of the UE and the identifier of the home mobile packet network of the UE. The application session data in the policy request message comprises the user identifier of the UE and the identifier of the home mobile packet network of the UE. Therefore, the PCRF can determine the user uniquely and make policy and charging decisions. Alternatively, the PCRF determines an IP-CAN session uniquely according to the user identifier of the UE and the identifier of the home mobile packet network of the UE, and delivers the policy and charging rules to the access gateway corresponding to the IP-CAN session.

Persons of ordinary skill in the art should understand that all or part of the steps of the method according to the embodiments of the present disclosure may be implemented by a program instructing relevant hardware. The program may be stored in a computer readable storage medium. When the program runs, the steps of the method according to the embodiments of the present disclosure are performed. The storage medium may be any medium that is capable of storing program codes, such as a Read-Only Memory (ROM), a Random Access Memory (RAM), a magnetic disk, or a Compact Disk Read-Only Memory (CD-ROM).

Figure 6:
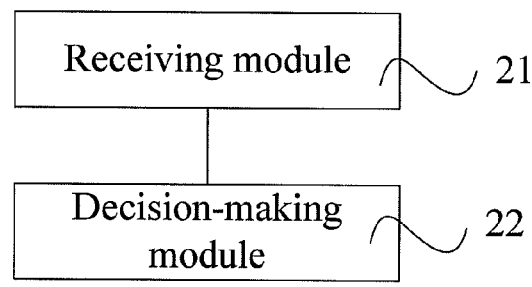
FIG. 6 shows a structure of a PDF according to an embodiment of the present disclosure.

FIG. 6 shows a structure of a PDF in an embodiment of the present disclosure. The PDF comprises: a receiving module 21, configured to receive application session data that comprises access network data and access user data; and a decision-making module 22, configured to make policy and charging decisions according to the application session data.

Figure 7:
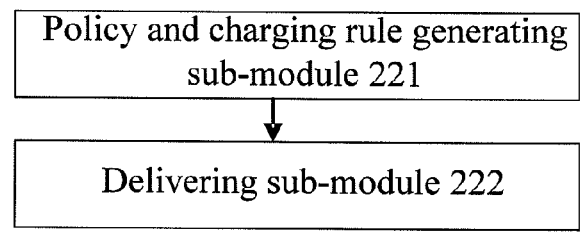
FIG. 7 shows a structure of a decision-making module according to a PDF in an embodiment of the present disclosure.

As shown in FIG. 7, the decision-making module 22 comprises: a policy and charging rule generating sub-module 221, configured to determine a UE identifier or an IP-CAN session according to the application session data, and generate policy and charging rules; and a delivering sub-module 222, configured to deliver the policy and charging rules to the PCEF to enforce policy and charging decisions.

The access user data comprises the IP address of the UE; the access network data comprises the identifier of the mobile packet network and/or the PDN identifier; the identifier of the mobile packet network comprises the identifier of the mobile packet network that allocates an IP address to the UE; the PDN identifier comprises at least one of these items: APN network identifier and access gateway address; the access user data comprises the user identifier of the UE, and the access network data comprises the identifier of the mobile packet network; and the identifier of the mobile packet network is the identifier of the mobile packet network in the home area of the UE.

The PDF may be a PCRF or a policy decision function.

The PDF can uniquely determine a user according to the access network data and the access user data included in the application session data, and make policy and charging decisions.

Figure 8:
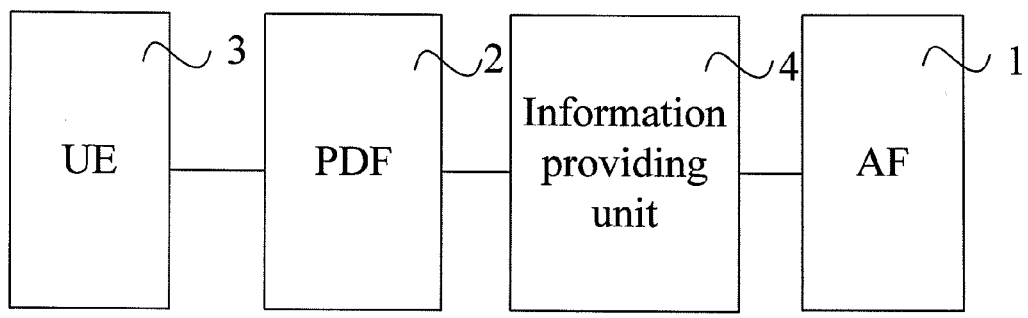
FIG. 8 shows a structure of a decision-making system according to an embodiment of the present disclosure.

FIG. 8 shows a structure of a policy decision system in an embodiment of the present disclosure. The system comprises: an AF 1, configured to provide application session data that comprises access network data and access user data; and a PDF 2, configured to receive the application session data and make policy and charging decisions according to the application session data.

Figure 9:
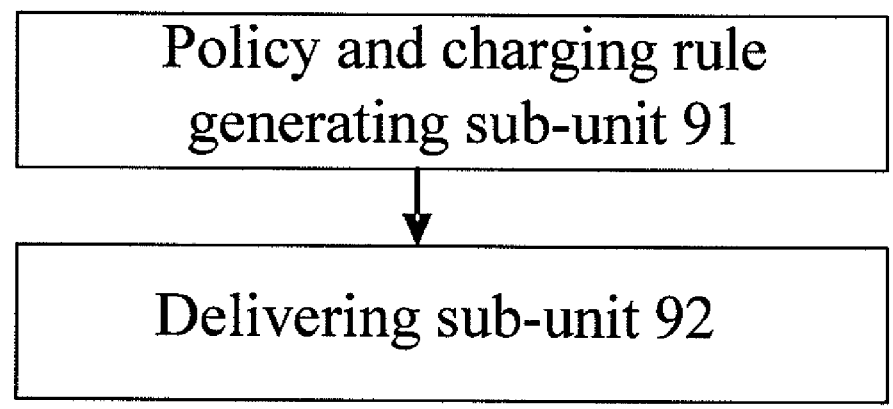
FIG. 9 shows a structure of a PDF in a decision-making system according to an embodiment of the present disclosure.

As shown in FIG. 9, the PDF 2 comprises: a policy and charging rule generating sub-unit 91, configured to determine a UE identifier or an IP-CAN session according to the application session data, and generate policy and charging rules; and a delivering sub-unit 92, configured to deliver the policy and charging rules to the PCEF to enforce policy and charging decisions.

The system further comprises: a UE 3, configured to provide access network data and access user data for the AF. The AF may further include an obtaining module, which is configured to interact with the UE to obtain the access network data and the access user data of the UE.

The system further comprises: an data providing unit 4, configured to provide access network data or access user data for the UE. The data providing unit may be a packet data gateway, service data gateway, or Mobility Management Entity (MME).

In the foregoing decision-making system, the application session data comprises access network data and access user data so that the PDF can uniquely determine a user according to the access network data and the access user data, and make policy and charging decisions.

It is understandable to those skilled in the art that all or part of the steps of the method in the foregoing embodiments may be implemented through hardware such as a processor instructed by a computer program, for example, PDF, PCEF, and AF. The program may be stored in a computer-readable storage medium accessible by the processor. When being executed, the program can perform the processes of the embodiments of the foregoing methods. The storage medium may be a magnetic disk, a Compact Disk Read-Only Memory (CD-ROM), a Read-Only Memory (ROM) or a Random Access Memory (RAM).

Finally, it should be noted that the above embodiments are merely provided for describing the technical solutions of the present disclosure, but not intended to limit the present disclosure. It is apparent that persons skilled in the art can make various modifications and variations to the disclosure without departing from the scope of the disclosure. The present disclosure is intended to cover the modifications and variations provided that they fall in the scope of protection defined by the following claims or their equivalents.

What is claimed is:

1. A decision-making method, comprising:
   receiving, by a Policy Decision Function (PDF) in a mobile network, application session data that comprises access network data and access user data, wherein the access network data comprises a Packet Data Network (PDN) identifier, the access user data comprises an IP address of a User Equipment (UE);
   determining, by the PDF, an Internet Protocol Connectivity Access Network (IP-CAN) session according to the PDN identifier and the IP address of the UE; and
   delivering, by the PDF, policy and charging rules to a Policy and Charging Enforcement Function (PCEF) corresponding to the IP-CAN session.

2. The decision-making method of claim 1, further comprising:
   receiving, by an Application Function (AF), the application session data that comprises the access network data and the access user data from the UE; and
   sending, by the AF, the access network data and the access user data to the PDF.

3. The decision-making method of claim 2, further comprising:
   sending, by the mobile network, the access network data and the access user data to the UE in a process of setting up the IP-CAN.

4. The decision-making method of claim 1, further comprising:
   sending, by an access gateway, an IP-CAN session creation indication to the PDF, wherein: the IP-CAN session creation indication comprises a user identifier of UE, the IP address, and at least one of these identifiers: the identifier of a mobile packet network and the PDN identifier;
   recording, by the PDF, a mapping relationship between the user identifier of the UE, the IP address, and the identifier of the mobile packet network; or
   recording, by the PDF, a mapping relationship between the user identifier of the UE, the IP address, and the PDN identifier; or
   recording, by the PDF, a mapping relationship between the user identifier of the UE, the IP address, the identifier of the mobile packet network, and the PDN identifier.

5. The decision-making method of claim 4, wherein the making policy and charging decisions according to the application session data comprises:

searching, by the PDF, a user subscription database according to the mapping relationship and the user identifier of the UE,
obtaining, by the PDF, subscription data of the user, and generating, by the PDF, policy and charging rules.

6. A decision-making system, comprising:
an Application Function (AF), configured to provide application session data that comprises access network data and access user data, wherein the access network data comprises a Packet Data Network (PDN) identifier, the access user data comprises an IP address of a User Equipment (UE); and
a Policy Decision Function (PDF), configured to receive the application session data, determine an Internet Protocol Connectivity Access Network (IP-CAN) session according to the PDN identifier and the IP address of the UE, and deliver policy and charging rules to a Policy and Charging Enforcement Function (PCEF) corresponding to the IP-CAN session.

7. The decision-making method of claim 1, further comprising:
determining, by the PDF, the UE according to the PDN identifier and the IP address of the UE;
generating, by the PDF, the policy and charging rules according to the information of the determined UE.

8. A device, configured to:
receive application session data that comprises access network data and access user data, wherein the access network data comprises a Packet Data Network (PDN) identifier, the access user data comprises an IP address of a User Equipment (UE);
determine an Internet Protocol Connectivity Access Network (IP-CAN) session according to the PDN identifier and the IP address of the UE; and
deliver policy and charging rules to a Policy and Charging Enforcement Function (PCEF) corresponding to the IP-CAN session.

9. The device of claim 8, further configured to:
determine the UE according to the PDN identifier and the IP address of the UE;
generate the policy and charging rules according to information of the determined UE.

10. The system of claim 6, wherein the PDF is further configured to:
determine the UE according to the PDN identifier and the IP address of the UE;
generate the policy and charging rules according to the information of the determined UE.

* * * * *